United States Patent
Mechnich

(10) Patent No.: US 7,348,287 B2
(45) Date of Patent: Mar. 25, 2008

(54) CERAMIC MATERIAL

(75) Inventor: Peter Mechnich, Bad Dürkheim (DE)

(73) Assignee: Duetsches Zentrum fur Luft und Raumfahrt E.V., Bonn (DE)

(*) Notice: Subject to any disclaimer, the term of this patent is extended or adjusted under 35 U.S.C. 154(b) by 126 days.

(21) Appl. No.: 11/270,355

(22) Filed: Nov. 9, 2005

(65) Prior Publication Data
US 2006/0100086 A1 May 11, 2006

(30) Foreign Application Priority Data
Nov. 9, 2004 (DE) ............... 10 2004 053 959

(51) Int. Cl.
C04B 35/505 (2006.01)
C04B 35/488 (2006.01)

(52) U.S. Cl. ............. 501/103; 501/152; 428/701; 428/702; 427/429; 427/430.1; 427/421.1; 427/255.38; 427/397.7; 427/397.8

(58) Field of Classification Search ............. 501/103, 501/152; 252/62; 428/701, 702; 427/429, 427/430.1, 421.1, 255.38, 397.7, 397.8
See application file for complete search history.

(56) References Cited

U.S. PATENT DOCUMENTS 5,985,470 A 11/1999 Spitsberg et al.
6,093,366 A 7/2000 Kato et al.
6,548,190 B2 * 4/2003 Spitsberg et al. ........... 428/633

FOREIGN PATENT DOCUMENTS

| DE | 10250037 | 5/2004 |
| EP | 1142852 | 10/2001 |
| JP | 64-51379 | * 2/1989 |

OTHER PUBLICATIONS

J. D. Webster et al.; Oxidation Protection Coatings for C/SiC Based on Yttrium Silicate; Journal of European Ceramic Society; vol. 18; pp. 2345-2350; 1998.
Isao Yuri et al; Recession Rate Prediction for Ceramic Materials in Combustion Gas Flow; ASME Turbo Expo 2003; Publication GT2003-38886.
Hagen Klemm et al; Corrosion of Ceramic Materials in Hot Gas Environment; 2004.

* cited by examiner

*Primary Examiner*—Karl E Group
(74) *Attorney, Agent, or Firm*—Harness, Dickey & Pierce, PLC

(57) ABSTRACT

The present invention relates to a ceramic material containing yttrium silicate which further contains zirconium, and to the use of said ceramic material as a heat and/or corrosion protection layer, and to a process for preparing coatings with said ceramic material.

10 Claims, 2 Drawing Sheets

CERAMIC MATERIAL

Figure 1:
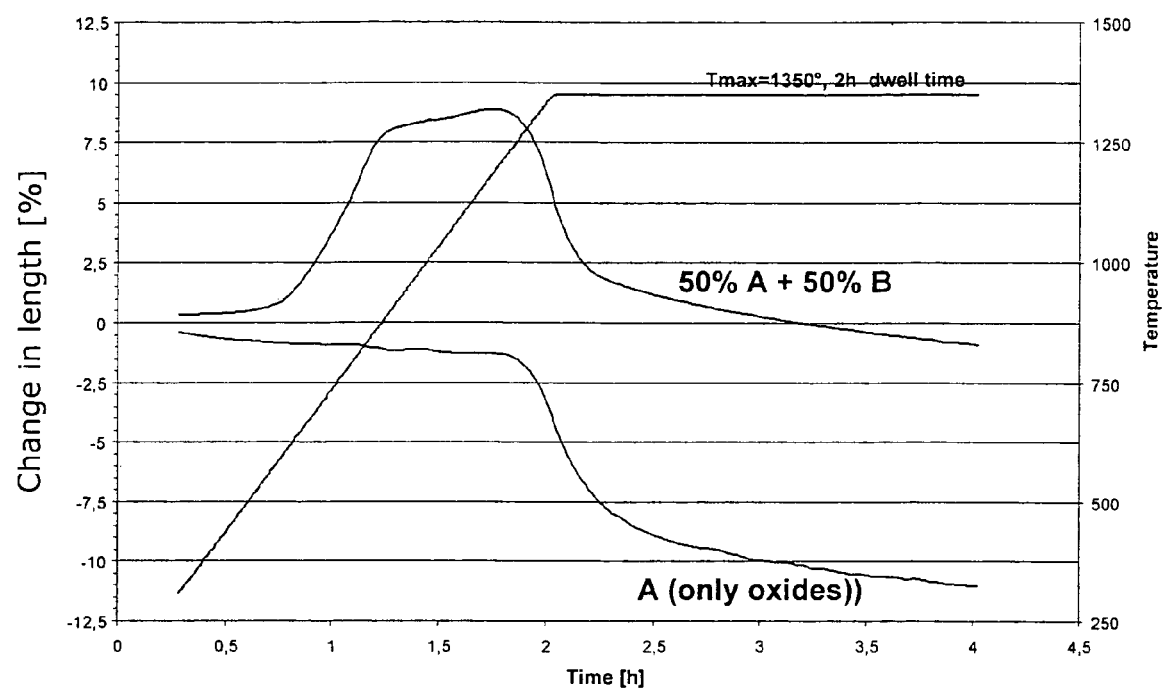

The present invention relates to a ceramic material containing yttrium silicate which further contains zirconium, and to the use of said ceramic material as a heat and/or corrosion protection layer, and to a process for preparing coatings with said ceramic material.

The use of materials in a highly aggressive environment, such as the zones of gas turbines where hot gasses are flowing through, is often possible only due to additional protective layers. A distinction is usually made between protective layers against thermal loads (TBCs, "thermal barrier coatings") and protective layers against chemical attack (EBCs, "environmental barrier coatings"), for example, hot-gas corrosion by water vapor. TBCs are mostly employed for the protection of metallic substrates, for example, turbine blades, at moderate temperatures of less than 1000° C. For this purpose, ceramics having a low thermal conductivity and high thermal expansion are employed. A typical representative is zirconia ($ZrO2$). The application of the TBCs to the metallic substrates is usually effected by physical vapor deposition methods, such as plasma spraying or electron beam physical vapor deposition (EB-PVD). Also in the field of non-oxidic ceramic substrates (for example, silicon carbide SiC, silicon nitride $Si3N4$), protective layers are employed. However, due to the high thermal stability of these materials, the focus is on protection from oxidation and attack against water vapor corrosion at temperatures of more than 1200° C. Since non-oxidic ceramic substrates generally have a much lower thermal expansion as compared to metals, the use of layer materials having a high thermal expansion, such as $ZrO2$, is problematic.

As promising materials for the protection of SiC substrates, there have been proposed, for example, compounds from the group of yttrium silicates, because they have a low diffusion of oxygen in combination and a thermal expansion comparable with that of SiC (Webster, J. D. et al.: Oxidation Protection Coatings for C/SiC Based on Yttrium Silicate, J. Europ. Ceram. Soc. 18, 2345-50 (1998)).

DE 102 50 037 B3 describes a protection layer system for the oxidation protection of C/SiC substrates which consists of a mullite layer on the substrate side and a cover layer of lanthanum hafnate or hafnium silicate.

In the field of oxidic materials, such as oxidic fiber composite materials (CMCs, ceramic matrix composites), a different need for protection from that of non-oxidic materials is found. The fibers and matrices of these materials usually consist of alumina ($\alpha$-$Al2O3$) and mullite ($Al6Si2O13$). The fibers (for example, Nextel™ 610, Nextel™ 720 of the 3M Company) can be employed up to a maximum permanent application temperature of about 1000 to 1200° C. Above these temperatures, a significant deterioration of the mechanical properties of the CMCs occurs due to accelerated granular growth. By a suitable thermal protection layer, the maximum onset temperature of oxidic CMCs could be increased significantly. Since the thermal conductivity of oxidic materials and especially of oxidic CMCs is comparatively low, a thermal protection by an additional layer can be achieved reasonably only if the layer has a still lower thermal conductivity. Since the oxides are per se oxidation-resistant, attention must be paid predominantly to corrosion, especially hot gas corrosion.

EP 1 142 852 A2 describes an aluminum oxide which is considerably more resistant against H2O vapor as compared to silica-containing materials, such as mullite, and is therefore also described as a (graded) coating material.

However, at temperatures of more than 1200° C., especially at more than 1300° C., $Al2O3$ also shows a high susceptibility to corrosion by H2O vapor (Yuri, I. et al.: Recession Rate Prediction for ceramic materials in Combustion Gas Flow, Proceedings of ASME TURBO EXPO 2003, Paper No. GT2003-38886; Klemm, H. et al.: Corrosion of Ceramic Materials in Hot Gas Environment, 29th Conference & Exposition on Advanced Ceramics and Composites, Cocoa Beach, 2004).

This is aggravated by the fact that $Al2O3$ is unstable towards molten alkali and alkaline earth compounds at high temperatures.

Compounds like $Na2SO4$ or $Na2CO3$ often occur as a product in the combustion of fossil energy sources, i.e., also in gas turbines. The thermal conductivity of $Al2O3$ layers is usually substantially higher than that of oxidic CMCs, so that a function of thermal protection is not affected.

As compared to alumina or mullite, zirconium oxide ($ZrO2$) has a very high resistance against hot-gas corrosion. This holds for both its stability against H2O vapor (Klemm, H. et al.: Corrosion of Ceramic Materials in Hot Gas Environment, 29th Conference & Exposition on Advanced Ceramics and Composites, Cocoa Beach, 2004) and its stability against alkali and alkaline earth compounds. In addition, $ZrO2$ is an advantageous material because it has a low thermal conductivity. However, $ZrO2$ layers have a high thermal expansion as compared to the usually employed oxidic substrate materials, such as $Al2O3$ or mullite, and therefore tend to cracking if there is no columnar layer structure. To date, protective layers for oxidic CMCs have been prepared on oxidic CMCs from $ZrO2$ by physical methods, such as electron beam physical vapor deposition (with columnar structure) and plasma spraying.

As compared to alumina or mullite, yttrium silicates also show a high resistance against hot-gas corrosion by H2O vapor (Klemm, H. et al.: Corrosion of Ceramic Materials in Hot Gas Environment, 29th Conference & Exposition on Advanced Ceramics and Composites, Cocoa Beach, 2004). Yttrium silicates also show a low thermal conductivity. As compared to the usually employed oxidic substrate materials ($Al2O3$/mullite), yttrium silicates have a lower thermal expansion. No protective layers made of yttrium silicates for oxidic CMCs have been described to date.

Previously known materials which are particularly stable against corrosion include $ZrO2$ and the compounds of the group of Y silicates. However, as shown in Table 1, no material meets all the features of the sought protection function. Above all, attention is to be paid to the very low thermal conductivity ($\lambda$=1 to 3·10−6 W/mK) and the thermal expansion of the oxidic CMC substrates ($\alpha$=6 to 8·10−6 K−1):

TABLE 1

| Material | Corrosion resistance | Thermal conductivity $\lambda$ | Thermal expansion $\alpha$ |
|---|---|---|---|
| $ZrO2$ | very good | low (about 1 to 2 W/mK) | high (about 11 to 12 · 10-6 K-1) |
| Y silicates | good | low (about 1 to 3 W/mK) | low (about 3 to 5 · 10-6 K-1) |

To date, $ZrO2$ coatings of oxidic CMCs have been prepared by depositions using physical methods, such as electron beam physical vapor deposition and plasma spraying. Y silicates have been prepared only by plasma spraying on non-oxidic CMCs. All these methods require a high expenditure of installations and equipment and are thus cost-intensive. In the preparation of high layer thicknesses within a range of several 100 µm, these methods reach their limits. Another problem is the fact that a sufficiently high and homogeneously distributed layer porosity cannot be achieved by these coating methods.

Thus, it is the object of the present invention to provide high-temperature resistance and corrosion resistance of ceramic protective layers by using a readily prepared material.

In a first embodiment, the above object is achieved by an yttrium-containing silicate ceramic material which is characterized by further containing zirconium.

Within the meaning of the present invention, the terms "yttrium" and "zirconium" are intended to mean, not the metal itself, but its presence in a compound, for example, as an oxide or silicate.

Preferably, the ceramic material contains yttrium silicate. Due to the presence of yttrium silicate, the ceramic material according to the invention also acts as a diffusion barrier against oxygen.

Preferably, the silicate ceramic material contains yttrium silicate and yttrium-stabilized zirconium oxide. Preferably, the phase composition comprises at least 40 to 60% of yttrium silicate and 40 to 60% yttrium-stabilized zirconium oxide. More preferably, the phase composition comprises about 50% yttrium silicate and about 50% yttrium-stabilized zirconium oxide. This enables preparation almost without shrinkage.

Due to the fact that the thermal conductivity of the layer materials ($ZrO_2$ and Y silicate) is in the same range as that of the oxidic CMCs, the thermal protection effect can be achieved particularly in the case where the structure of the layers causes a further reduction of thermal conductivity due to porosity. Advantageously, the ceramic material has a pore volume within a range of from 10 volume percent to 50 volume percent, especially within a range of from 20 volume percent to 40 volume percent.

Due to its porosity, the ceramic material is particularly resistant against thermal shocks and has a high thermal insulation. In addition, the porosity effectively prevents the spreading of locally occurring damages.

It is advantageous if the grain size of the yttrium-stabilized zirconium oxide is smaller than the grain size of the yttrium silicate. Due to the higher density and thus smaller volume fraction of the zirconium oxide, it results in more phase boundaries in the ceramic material, which in turn improves the thermal shock resistance and heat insulation. A low thermal conductivity is achieved by the combination of the low thermal conductivity materials $ZrO_2$ and Y silicate as well as the many phase boundaries, i.e., possible scattering of thermal vibrations between the $ZrO_2$ and Y silicate and additionally a homogeneously distributed high porosity.

Advantageously, the ceramic material is corrosion-resistant against water vapor at temperatures of more than 1200° C. Thus, the material can be employed in EBCs.

The thermal conductivity of the ceramic material is preferably in a range which enables the material to be employed in TBCs.

Advantageously, the ceramic material has a thermal expansion coefficient within a range of from 5 to 9·10−6 K−1. By combining a low thermal expansion (Y silicates) and a high thermal expansion ($ZrO_2$), a medium thermal expansion comparable to those of typical oxidic substrates is achieved. For example, for a mixture of 50% $ZrO_2$+50% yttrium silicate, a thermal expansion of about 8×10−6 K−1 results, while the thermal expansion of $Al_2O_3$ is also about 8×10−6 K−1. Thus, the advantage of a thermal expansion coefficient within the mentioned preferred range resides in the fact that the thermal expansion coefficient of the ceramic material according to the invention can be matched to the thermal expansion coefficients of the usual substrates.

Preferably, the ceramic material has a high thermal cycling resistance. Thus, the ceramic material according to the invention can be employed in maintenance-free environments in principle, or even becomes suitable for certain applications, such as aircraft turbines, in the first place.

In another embodiment, the above object is achieved by the use of the ceramic material according to the invention as a thermal and/or corrosion protection layer, for example, in the zone of gas turbines where hot gasses are flowing through. For example, applications are in the field of protection from oxide-ceramic fiber composite materials which are employed in the field of hot-gas stressed components in engine construction. Examples which may be mentioned include components of gas turbines, such as combustion chamber linings or exhaust gas ducts.

In a last embodiment, the object of the present invention is achieved by a process for the preparation of coatings using the ceramic material according to the invention, characterized by comprising the following steps:

a) mixing the materials $ZrSi_2$, $Y_2O_3$, $ZrO_2$, $SiO_2$ and ZrN in powder form and a solvent to form a powder dispersion;

b) applying the powder dispersion to a substrate by means of techniques selected from the group consisting of brushing, dipping, vapor-depositing, spraying and casting; and c) subjecting the coating to a heat treatment at a temperature within a range of from 1200 to 1400° C.

The preferred solvent is an alcohol. Isopropanol is particularly preferred.

The heat treatment is preferably performed at about 1350° C. for a period of time, for example, within a range of from 1 to 4 hours, more preferably about 2 hours.

Thus, the preparation of the ceramic layers according to the invention is effected, in particular, by simply applying a powder dispersion to the substrates using conventional techniques (brushing, dipping, spraying etc.), followed by a heat treatment. The process is characterized by also being suitable for the coating of oxidic CMCs with a process temperature of <1400° C. The shaping of, in particular, monolithic $ZrO_2$/Y silicate ceramics may also be effected by classical methods, such as mold pressing or slip casting.

In principle, the preparation of the $ZrO_2$/Y silicate ceramics may also be effected conventionally by sintering $ZrO_2$ and Y silicate powders. However, at temperatures of <1400° C., this sinter process does not result in sufficiently strong bonding. Therefore, a process based on $ZrO_2$, $SiO_2$ and $Y_2O_3$ in which the formation of the Y silicate is effected in situ by the reaction of the oxides $Y_2O_3$ and $SiO_2$ is more promising. It is particularly important that the reaction of $SiO_2$ and $Y_2O_3$ proceeds preferentially, i.e., the formation of zirconium silicate $ZrSiO_4$ is completely prevented. The presence of $Y_2O_3$ reduces the compaction of the ceramics promoted by free $SiO_2$, i.e., the loss of porosity. By the use of non-oxidic components, the process-caused volume change can be further minimized. There may be mentioned, for example, silicon compounds, such as Si, SiC, $Si_3N_4$, zirconium compounds, such as ZrC, ZrN and yttrium compounds, such as YN, which are converted to the corresponding oxides in the course of the heat treatment and thereby increase their volumes.

For example, a ceramic material consisting of equal parts of fully Y-stabilized cubic ZrO2 (so-called "Yttria-Fully Stabilized", Y-FS) and the Y silicate Y2Si2O7 was prepared at 1350° C.

If the reaction is performed only with oxidic starting materials, it proceeds according to Scheme (A):

$$(Y\text{-}FS)ZrO_2 + 2SiO_2 + Y_2O_3 \rightarrow (Y\text{-}FS)ZrO_2 + Y_2Si_2O_7 \quad (A)$$

wherein "FS" stands for "fully stabilized".

ZrO2 and SiO2 may be replaced by the compound ZrSi2 to achieve an increase in volume caused by oxidation. Of particular advantage is the fact that ZrSi2 is completely oxidized to ZrO2 and SiO2 at temperatures of below 1300° C., because in contrast to Si or SiC, an oxide layer which significantly slows down the reaction kinetics, i.e., oxygen diffusion, does not form on the ZrSi2 grains. Again, the yttrium oxide has the function to effectively prevent the formation of zirconium silicate ZrSiO4.

Completely replacing ZrO2 and SiO2 by zirconium silicide ZrSi2 and an excess of Y2O3 to fully stabilize ZrO2 results in a reaction according to Scheme (B):

$$ZrSi_2 + 1.1\ Y_2O_3 \rightarrow (Y\text{-}FS)ZrO_2 + Y_2Si_2O_7 \quad (B)$$

If both processes are combined, i.e., by a partial replacement $(ZrO2+2SiO2) \rightarrow ZrSi2$, the reaction-caused shrinkage can be compensated for. In the present case, an almost shrinkage-free preparation was obtained at about 1350° C. and a total process time of about 4 hours for the combination 50% (A)+50% (B).

FIG. 1 documents the time course of the length or volume change during the heat treatment.

Figure 2:
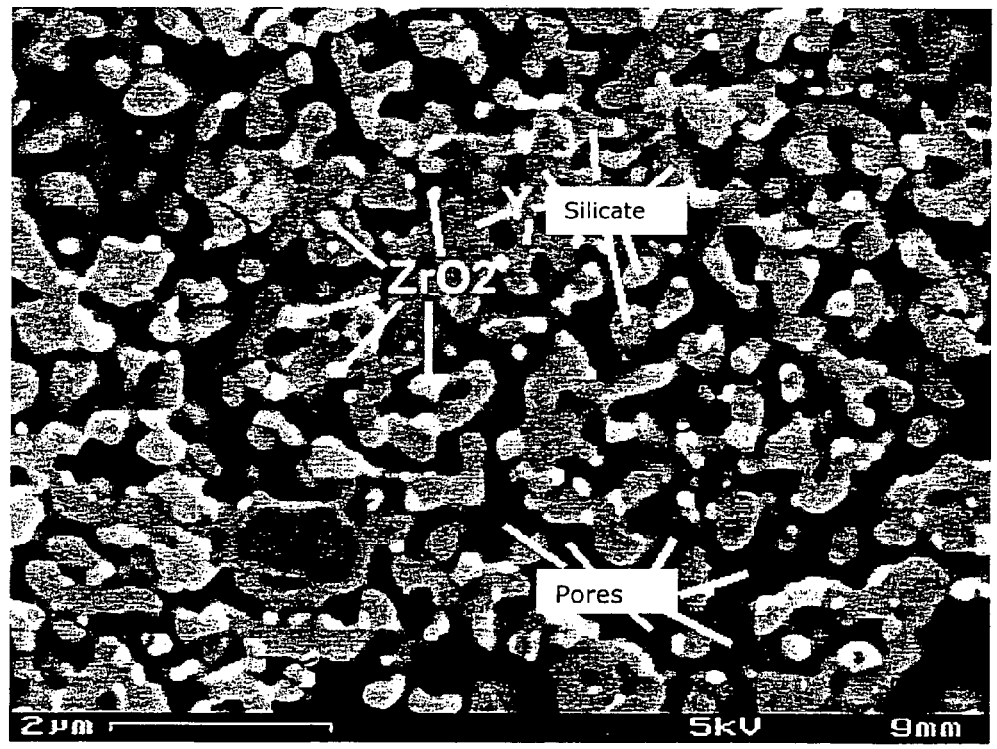

FIG. 2: In FIG. 2, the ZrO2-Y2Si2O7 ceramics show a microstructure which is characterized by very small grain sizes of the phases ZrO2 (light) and Y silicate (medium gray). From the 1:1 composition, a smaller volume fraction for ZrO2 results due to its higher density. The structure has very many phase boundaries, the pore structure is homogeneous (dark gray recesses which have been filled with an embedding medium for preparation). Due to the structure, a high thermal shock resistance and high thermal insulation are to be expected.

Figure 3:
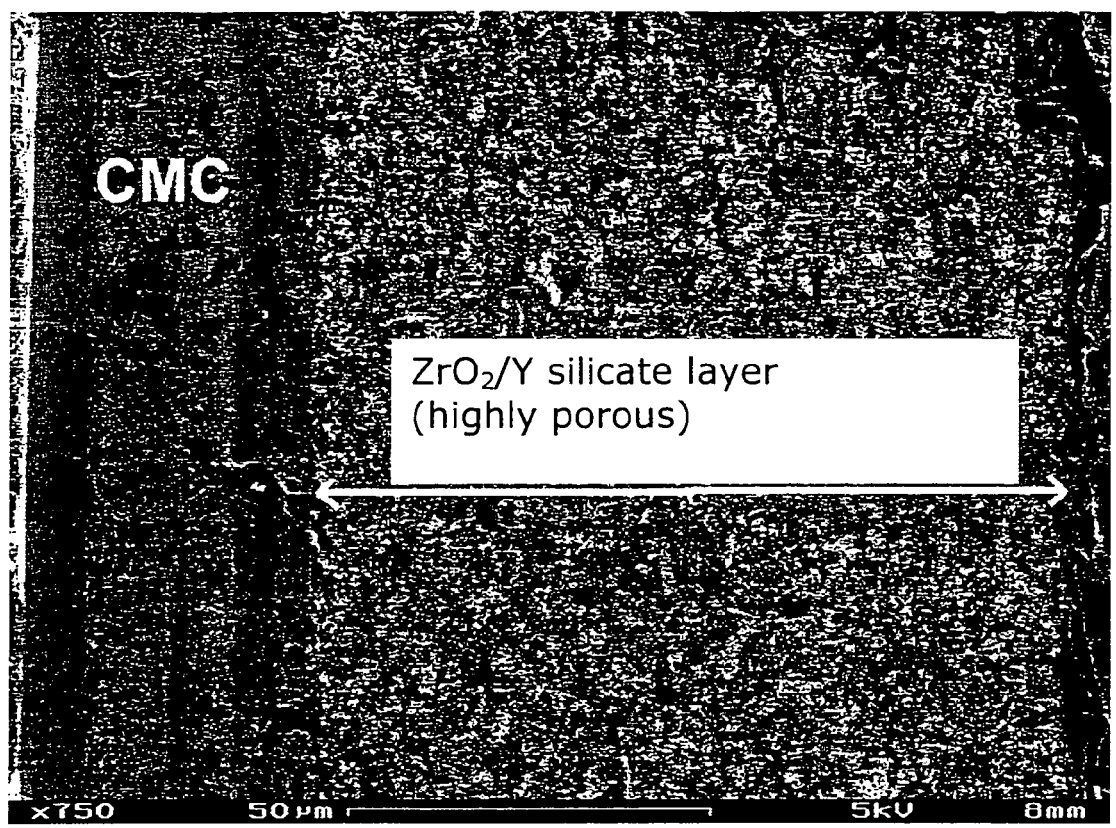

FIG. 3 shows a highly porous ZrO2/Y silicate layer of 100 μm thickness on an oxide-ceramic fiber composite material (CMC) which was prepared by applying a suspension by brushing, followed by heat treatment (1350° C., 1 hour).

Ceramics according to the invention with a composition of Y2Si2O7+(Y)-ZrO2 are probably formed by the following mechanism:

The oxidation reaction of ZrSi2 proceeds according to the following scheme in principle:

$$ZrSi_2 + 3\ O_2 \rightarrow ZrO_2 + 2\ SiO_2 \quad (1)$$

However; in reality, a further reaction to the phase zircon (ZrSiO4) occurs immediately:

$$ZrO_2 + 2\ SiO_2 \rightarrow ZrSiO_4 + SiO_2 \quad (2)$$

However, the formation of ZrSiO4 is suppressed by the presence of Y2O3.

The formation of the Y silicate Y2Si2O7 is effected according to the scheme:

$$Y_2O_3 + 2\ SiO_2 \rightarrow Y_2Si_2O_7 \quad (3)$$

For stabilizing the formed ZrO2 from (1) with Y, an excess of Y2O3 is required. This condition is met in the starting composition by additionally incorporating 0.1 mol of Y2O3 in (3).

Therefore, the overall reaction for Example 1 reads thus:

$$ZrSi_2 + 3\ O_2 + 1.1\ Y_2O_3 \rightarrow Y_2Si_2O_7 + Y_{0.09}Zr_{0.91}O_2 \quad (4)$$

In order to limit the volume expansion of the ceramics during the oxidation reaction, parts of the oxidizing phase (here ZrSi2) can be replaced by the corresponding oxides (here ZrO2 and SiO2). In Example 1, 50% by weight of the ZrSi2 is correspondingly replaced by [(8Y)-ZrO2+2 SiO2].

Ceramics according to the invention with a composition of Y2SiO5+(Y)-ZrO2 are probably formed by the following mechanism:

At first, the reaction proceeds by analogy with (1) and (2) as above. By the presence of Y2O3, the formation of the phase ZrSiO4 is suppressed by analogy with the above stated mechanism.

The Y silicate Y2SiO5 is formed according to the scheme:

$$Y_2O_3 + SiO_2 \rightarrow Y_2SiO_5 \quad (5)$$

To obtain the sought composition of ZrO2+Y2SiO5, ZrN is introduced in (1) as an additional non-oxidic starting material for ZrO2.

$$ZrSi_2 + ZrN + 4O_2 \rightarrow ZrO_2 + 2\ SiO_2 + [NO_x\uparrow] \quad (1A)$$

For stabilizing the formed ZrO2 with Y, an excess of Y2O3 is required by analogy with Example 1.

Therefore, the overall reaction for Example 2 reads thus:

$$0.5\ ZrSi_2 + 0.5\ ZrN + 2\ O_2 + 1{,}1\ Y_2O_3 \rightarrow Y_2SiO_5 + Y_{0.09}Zr_{0.91}O_2 \quad (6)$$

By analogy with the mechanism mentioned first, parts of the oxidizing phases (here ZrSi2 and ZrN) can be replaced by the corresponding oxides (here ZrO2 and SiO2). In this second mechanism, 50% by weight of (ZrSi2+ZrN) is correspondingly replaced by (2 (8Y)—ZrO2+2 SiO2).

EXAMPLES

Ceramics each having a molar phase composition of 50% Y silicate (Y2Si2O7 or Y2SiO5) and 50% zirconium oxide (Y-stabilized) were prepared. The heat treatment was performed in an oxidizing atmosphere (air).

ZrSi2 (ABCR GmbH, Karlsruhe), Y2O3 (H. C. Starck, Goslar, DE), ZrO2 (8Y) (Tosoh, Krahn GmbH Hamburg, DE), SiO2 glass (Heraeus, Hanau, DE) and ZrN (H. C. Starck, Goslar, DE) served as the starting powders. Due to their grain size as supplied, the ZrSi2 and SiO2 powders were ground in a planetary ball mill (Si3N4 grinding bowl and balls) in isopropanol for 30 min, followed by drying.

Example 1

Ceramics with the Composition Y2Si2O7+(Y)-ZrO2

10 g of the starting powder consists of 1.1195 g of ZrSi2, 0.9358 g of (8Y)-ZrO2, 7.0319 g of Y2O3 and 0.9128 g of SiO2.

It was admixed with 0.5 g of polyoxyethylene (PEG 1500, Hoechst, DE) and homogenized in a planetary ball mill in 50 g of 2-propanol for 20 min. After drying, the powder mixture was sieved, and tablets (about 2 g, d=15 mm) were prepared therefrom in a uniaxial hydraulic press at about 200 MPa. The specimens were heated to 1350° C. with 10° C./min and annealed for 2 hours. The change in length of the specimens was recorded with a dilatometer. From the measurements, it could be seen that a relatively strong expansion by about 9% occurred at from about 600° C. to 1250° C. When the maximum temperature of 1350° C. was reached, the sample began to shrink significantly, so that a change of length of the specimen of about −1% was observed after two hours.

Example 2

Ceramics with a Composition of Y2SiO5+(Y)-ZrO2

10 g of the starting powder consisted of 0.9402 g of ZrSi2, 0.6712 g of ZrN, 1.5722 g of (8Y)-ZrO2, 6.0498 g of Y2O3 and 0.7666 g of SiO2.

The preparation of specimens and heat treatment was effected by analogy with Example 1.

From the measurements in the dilatometer, it could be seen that an extension of the specimen by about 4.5% was affected within a range of from 600° C. to 1250° C. When the maximum temperature of 1350° C. was reached, a shrinking occurred, so that a change of length of the specimen of about −0.5% was observed after two hours.

The invention claimed is:

1. Yttrium-containing silicate ceramic material, further comprising crystalline grains of zirconium oxide, said material having a pore volume within a range of from 10 volume percent to 50 volume percent.

2. The ceramic material according to claim 1, said material contains yttrium silicate and yttrium-stabilized zirconium oxide.

3. The ceramic material according to claim 2, said yttrium silicate contains yttrium silicate grains and said yttrium-stabilized zirconium oxide containing yttrium-stabilized zirconium oxide grains.

4. The ceramic material according claim 3, wherein the grain size of the yttrium-stabilized zirconium oxide is smaller than the grain size of the yttrium silicate.

5. The. ceramic material according to claim 1, wherein said ceramic material being corrosion-resistant against water vapor at temperatures of more than 1200° C.

6. The ceramic material according to claim 1, wherein said ceramic material having a thermal conductivity within a range of from 1 to 3 W/mK.

7. The ceramic material according to claim 1, wherein said ceramic material having a thermal expansion coefficient within a range of from 5 to $9 \times 10^{-6}$ $K^{-1}$.

8. A process for the preparation of coatings with a ceramic material according to claim 1 comprising the following steps:

a) mixing the materials $ZrSi_2$, $Y_2O_3$, $ZrO_2$, $SiO_2$ and ZrN in powder form and a solvent to form a powder dispersion;

b) applying the powder dispersion to a substrate by means of techniques selected from the group consisting of brushing, dipping, vapor-depositing, spraying and casting; and c) subjecting the coating to a heat treatment at a temperature within a range of from 1200 to 1400° C.

9. The ceramic material according to claim 2 wherein said ceramic material includes a phase composition of at least 40 to 60% of yttrium silicate and 40 to 60% of yttrium-stabilized zirconium oxide.

10. The ceramic material according to claim 1 wherein said material has a pore volume within a range of from 20 volume percent to 40 volume percent.

* * * * *